US006201813B1

(12) United States Patent
Klausmeier et al.

(10) Patent No.: US 6,201,813 B1
(45) Date of Patent: *Mar. 13, 2001

(54) METHOD AND APPARATUS FOR USING ATM QUEUES FOR SEGMENTATION AND REASSEMBLY OF DATA FRAMES

(75) Inventors: Daniel E. Klausmeier, Sunnyvale; Kevin Wong, San Jose; David A. Hughes, Moutain View, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,705

(22) Filed: Jun. 30, 1997

(51) Int. Cl.[7] .......................... H04L 12/28; H04L 12/56; H04L 12/54

(52) U.S. Cl. .......................................... 370/412; 370/474

(58) Field of Search .................................... 370/395, 397, 370/399, 412, 413, 415, 417, 428, 429, 469, 471, 474, 476, 465, 235, 230, 229, 236, 234, 381, 396, 359, 379, 389, 392, 409

(56) References Cited

U.S. PATENT DOCUMENTS 5,274,768 * 12/1993 Traw et al. .......................... 370/397
5,311,509 * 5/1994 Heddes et al. ....................... 370/412
5,313,454 * 5/1994 Bustini et al. ....................... 370/231
5,379,297 * 1/1995 Glover et al. ........................ 370/412
5,412,655 * 5/1995 Yamada et al. ...................... 370/474
5,469,433 * 11/1995 McAuley ............................ 370/474
5,530,698 * 6/1996 Kozaki et al. ....................... 370/412
5,548,587 * 8/1996 Bailey et al. ........................ 370/412
5,550,823 * 8/1996 Irid et al. ............................ 370/413
5,557,604 * 9/1996 Usumi et al. ........................ 370/395
5,568,477 * 10/1996 Galand et al. ....................... 370/471
5,570,362 * 10/1996 Nishimura ........................... 370/395
5,625,625 * 4/1997 Oskouy et al. ...................... 370/395
5,633,861 * 5/1997 Hanson et al. ....................... 370/232
5,704,047 * 12/1997 Schneeberger ....................... 370/229
5,742,765 * 4/1998 Wong et al. ......................... 370/465
5,765,032 * 6/1998 Valizadeh ............................ 370/235
5,768,275 * 6/1998 Lincoln et al. ...................... 370/474
5,793,747 * 8/1998 Kline .................................. 370/230
5,796,735 * 8/1998 Miller et al. ......................... 370/395
5,838,677 * 11/1998 Kozaki et al. ....................... 370/412
5,850,395 * 12/1998 Hauser et al. ....................... 370/398
5,898,688 * 4/1999 Norton et al. ....................... 370/362
5,974,466 * 10/1999 Mizutani et al. .................... 370/236
5,982,783 * 11/1999 Frey et al. .......................... 370/467
5,999,518 * 12/1999 Nattkemper et al. ................ 370/258
5,999,533 * 12/1999 Peres et al. ......................... 370/395
6,028,844 * 2/2000 Hao et al. ........................... 370/242
6,058,114 * 5/2000 Sethuram et al. ................... 370/397
6,084,880 * 7/2000 Bailey et al. ........................ 370/395

* cited by examiner

*Primary Examiner*—Dang Ton
*Assistant Examiner*—Phirin Sam
(74) *Attorney, Agent, or Firm*—Blakely, Sokoloff, Taylor & Zafman LLP

(57) ABSTRACT

A plurality of cells are received from a digital network and stored in a logical queue. The cells contain data information and logical connection information and the logical queue corresponds to the logical connection identified by the logical connection information. The cells are combined into a frame by extracting the cells from the logical queue and storing the cells to a local memory so that the data information is preserved. Extraction may be accomplished by notifying a local processor that the frame's worth of data is ready and then transferring the data information of the cells to a local memory at the direction of the local processor. During the transfer, error detection operations may be performed. Information may be transmitted into the digital network by segmenting a frame of data into a plurality of cells and injecting each of the cells into a logical queue. The logical queue may be constructed with a series of linked list pointers associated with the memory locations. The cells may then be transmitted into the digital network in an order consistent with the linked list pointers.

7 Claims, 5 Drawing Sheets

Local Processor 130
Local Memory 132
DMA Engine 136
Control Path
Cell Path
Segmentation Engine 134
Cell Input Engine 116

METHOD AND APPARATUS FOR USING ATM QUEUES FOR SEGMENTATION AND REASSEMBLY OF DATA FRAMES

RELATED APPLICATIONS

This application is related to the following co-pending applications, each assigned to the Assignee of the present application:

Application Ser. No.: 08/884,999, filed Jun. 30, 1997, entitled "Method and Apparatus for Maximizing Memory Throughput", by Daniel E. Klausmeier and Kevin Wong.

Application Ser. No.: 08/885,400, filed Jun. 30, 1997, entitled "Multi-Stage Queuing Discipline", by Daniel E. Klausmeier, Kevin Wong, Quang Nguyen, Cherng-Ren Sue and David A. Hughes.

FIELD OF THE INVENTION

The present invention relates to a method and apparatus for handling information sent through a digital network and, more specifically, to the segmentation and reassembly of data frames within an ATM network.

BACKGROUND

Asynchronous Transfer Mode (ATM) or "cell switching" is a method of transmitting digital information wherein the information is broken into equal sized units called cells. The individual cells of information are transmitted from a source node to a destination node through a pathway (or connection) through a digital network. The digital network may be constructed of digital switches coupled together by digital communication links which carry the cells of information between the digital switches along the connection. The digital switches route the cells from incoming communication links to outgoing communication links and finally to the destination node.

Before any information can be transported through the network as ATM cells, the information must be segmented into cells. Typically, this is accomplished by segmentation and reassembly (SAR) engines which are used to "chop up" user data (typically formatted as variable length frames) into fixed length cells for transmission. As the data frames are segmented, ATM header information is added to each cell and the cells are transmitted into the ATM network. During reception, the header information is stripped from the cells and the remaining fixed length payloads are reassembled into variable length data frames for use by appropriate user applications. Typically, the payload information for each cell is copied into memory as it is received during the reassembly process.

In ATM networks the segmentation and reassembly (SAR) functions are performed at the interface between an ATM layer and an ATM adaptation layer (AAL). During transmission, higher level services pass user data to the AAL where, first, a convergence sublayer forms convergence layer protocol data units (CS-PDUs). These CS-PDUs will, generally, be larger than the payload capacity of an ATM cell. Therefore, a second sublayer, the segmentation and reassembly (SAR) sublayer, accepts the variable length CS-PDUs and fragments them into appropriate payloads (48-bytes) for transmission. These payloads are referred to as segmentation and reassembly protocol data units (SAR-PDUs) and are passed to lower layers in the ATM protocol model for further processing. During reception, a reverse operation takes place and the SAR sublayer is responsible for reassembling messages as they are received.

Several ATM AALs have been developed for various applications. AAL Type 5 (AAL-5) was designed for variable bit rate, connection-oriented or connectionless services and provides good error detection/correction capabilities and high line efficiency. The AAL-5 methodologies are illustrated in FIG. 1. During transmission, a user message 10 is passed from higher level protocols to the AAL, where it is referred to as an AAL Service Data Unit (AAL-SDU) 12. As shown in FIG. 1, the AAL-5 convergence sublayer uses the AAL-SDU 12 to create variable length protocol data units (CS-PDUs) 14. The CS-PDUs are made up of various fields. The User Data Field 16 comprises data from the higher layer protocols and may be up to 65,535 bytes in length. The Pad field 18 is used to align the entire CS-PDU 14 on a 48-byte boundary (i.e., the entire CS-PDU 14 is a multiple of 48-bytes in length). The Control field 20 is two bytes in length and is presently reserved for future use. The Length field 22 indicates the actual length of the User Data Field 16 and is two bytes long. The CRC-32 field 24 is appended to provide error detection in the CS-PDU 14.

CS-PDUs are passed to the AAL-5 SAR sublayer. The SAR sublayer fragments the CS-PDUs to fixed-length SAR-PDUs 26, each 48-bytes long. There are no new headers or trailers added by the SAR sublayer in AAL-5. No padding is necessary because the CS-PDU 14 was padded to a multiple of 48-bytes. As further shown in FIG. 1, the SAR-PDU 26 is passed to the ATM layer where a 5-byte header 28 is added to form an ATM cell 30. During reception, these operations are performed in a reverse order to rebuild the user message 10.

SUMMARY OF THE INVENTION

It is an object of the invention to provide means for cell segmentation and reassembly in a digital switch.

In one embodiment, a method of reassembling frames within a switch of a digital network is provided. A plurality of cells are received at the switch and stored in a logical queue. The cells contain data information and logical connection information and the logical queue corresponds to the logical connection identified by the logical connection information. The cells are combined into a frame by extracting the cells from the logical queue and storing the cells to a local memory so that the data information is preserved. The cell extraction may be accomplished by identifying a last cell of the plurality of cells, the last cell indicating an end of the frame, and then identifying a frame length for the frame. The frame length may be provided to a local processor and the data information of the cells transferred to a number of memory locations in a local memory at the direction of the local processor, the number of memory locations being based on the frame length. The memory locations may be contiguous and the transfer may be accomplished using a DMA engine. During the transfer, error detection operations, such as computing a CRC-32 value for the data information during and comparing the computed CRC-32 value with a received CRC-32 value for the frame, may be performed.

In a further embodiment, a method of transmitting information in a digital network is provided. The method includes segmenting a data frame into a plurality of cells and injecting each of the cells into a logical queue associated with a connection for the frame in a digital network. The step of injecting may include transferring each of the cells to a number of memory locations within a cell memory; and establishing a series of linked list pointers associated with the memory locations, the series of linked list pointers comprising the queue. The cells may then be transmitted into the digital network in an order consistent with the linked list pointers.

In yet another embodiment, a digital switch is provided. The digital switch may include a queuing circuit configured to store a plurality of ATM cells comprising a frame. The cells include payload information and logical connection information and are organized into a logical queue based upon the logical connection information. The switch may further include a reassembly engine configured to detect a last cell of the frame, to notify a local processor of the switch when the last cell is detected, to receive an extraction request from the local processor in response to the notification, and to extract the cells from the memory so as to preserve the payload information. The reassembly engine may further be configured to strip off the logical connection information from the cells while extracting the cells from memory. In addition, the reassembly engine may perform error detection operations for the frame using the payload information while extracting the cells. For example, the reassembly engine may compute a CRC-32 value for use in the error detection operations.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Methods and apparatus for using ATM queues for segmentation and reassembly of data frames are disclosed. Although discussed with reference to certain illustrated embodiments, upon review of this Specification, those skilled in the art will recognize that the present invention may find application in a variety of systems. Therefore, in the following description the illustrated embodiments should be regarded as illustrative only and should not be deemed to limit the scope of the present invention.

Figure 1:
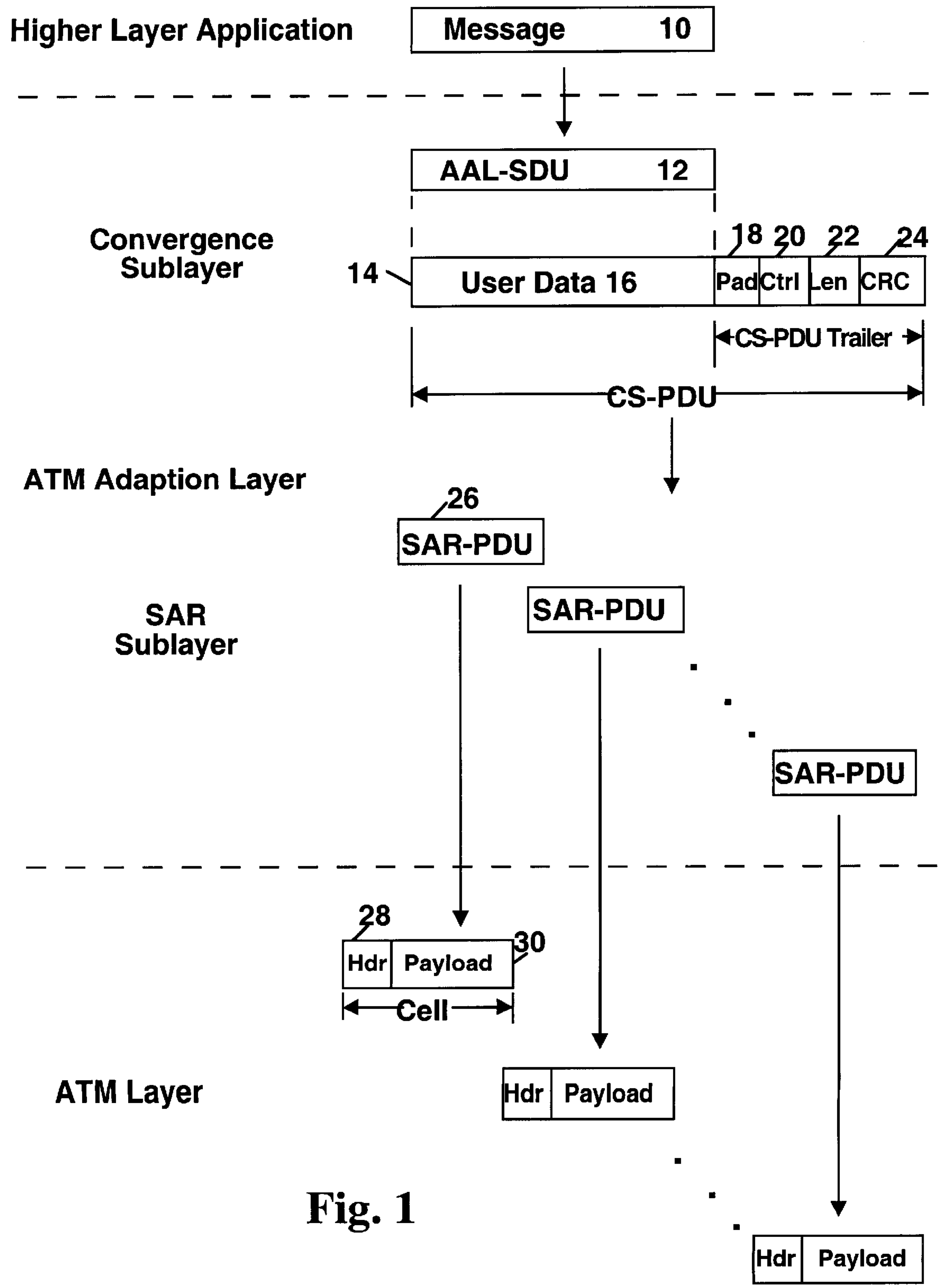
FIG. 1 illustrates a conventional segmentation and reassembly process for ATM cells.
Figure 2:
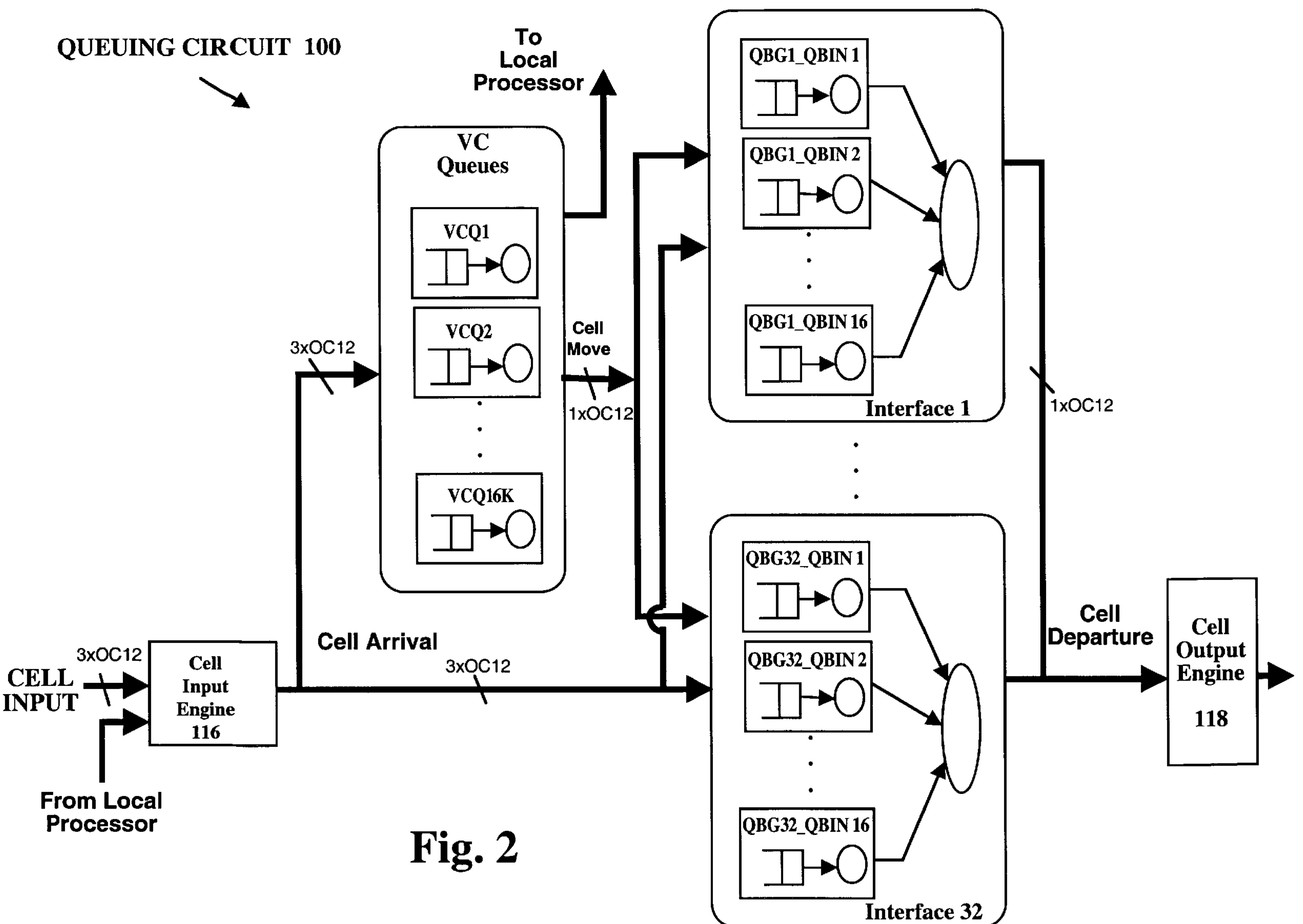
FIG. 2 illustrates functional components of an ATM queuing circuit according to one embodiment of the present invention.

FIG. 2 illustrates the functional components of an ATM queuing circuit 100. Queuing circuit 100 maintains various cell queues, including VC queues that correspond to individual connections and class of service (or QBin) queues which are organized into groups (QBGs) and are used to sort different traffic types. The QBGs may correspond to different physical or virtual interfaces as described in a related application Ser. No. 08/885,400, filed Jun. 30, 1997, entitled "Multi-Stage Queuing Discipline", by Daniel E. Klausmeier, Kevin Wong, Quang Nguyen, Cherng-Ren Sue and David A. Hughes, the complete disclosure of which is incorporated herein by reference. Although in one embodiment queuing structure 100 is implemented at a digital switch in an ATM network, such a queuing structure and circuit may find application wherever congestion may occur in a digital network.

ATM cells arrive and are placed into a queue in a cell memory until the cell is serviced. In one embodiment incoming cells are stored in separate dynamic random access memory (DRAM) and the various queues are implemented through the use of linked lists. The manner in which such linked list queues are implemented and controlled is discussed in detail in a related application Ser. No. 08/884,999, entitled "Method and Apparatus for Maximizing Memory Throughput", filed Jun. 30, 1997 by Daniel E. Klausmeier and Kevin Wong, the complete disclosure of which is incorporated herein by reference. Briefly, as cells are received at queuing circuit 100, they are temporarily stored in a cell memory prior to transmission on an outgoing communication link. A linked list data base is used to keep track of the location and sequence of the cells in the cell memory. That is, a series of "next entry" pointers are established such that each sequence of entries are linked together. Each connection and class of service has a corresponding linked list queue (VC queue or QBin queue, respectively) and a queue manager maintains the links in each of the queues so that the entries (i.e., pointers) in the linked lists are updated to reflect cell arrivals (to the tail of a VC queue or a QBin queue), cell moves (from the head of a VC queue to the tail of a QBin queue) and cell departures (from the head of a QBin queue).

Some of the cells received at queuing circuit 100 will be transmitted through the queuing structure. Other cells, however, will be part of data frames which are terminated at a local processor associated with queuing circuit 100. For example, signaling information which is transmitted through the digital network along the same path as the user data may be destined for a local processor associated with queuing circuit 100. Such cells must be reassembled into frames before the information can be used by the local processor. Similarly, the local processor may need to transmit signaling or other information to other nodes of the network. Frames of data from the local processor must first be segmented into ATM cells before they can be transmitted through the network. The present invention allows for such segmentation and reassembly (SAR) operations using the two tier queue structure already provided for other ATM traffic. As further discussed below, cells associated with frames destined for the local processor are queued in a regular VC queue and the local processor is notified when an entire frame is ready to be extracted. Similarly, cells belonging to frames generated by the local processor are injected into an appropriate VC queue or QBin queue to join the other cells in the network. Frame extraction and injection is controlled by a queue controller as discussed below.

Figure 3:
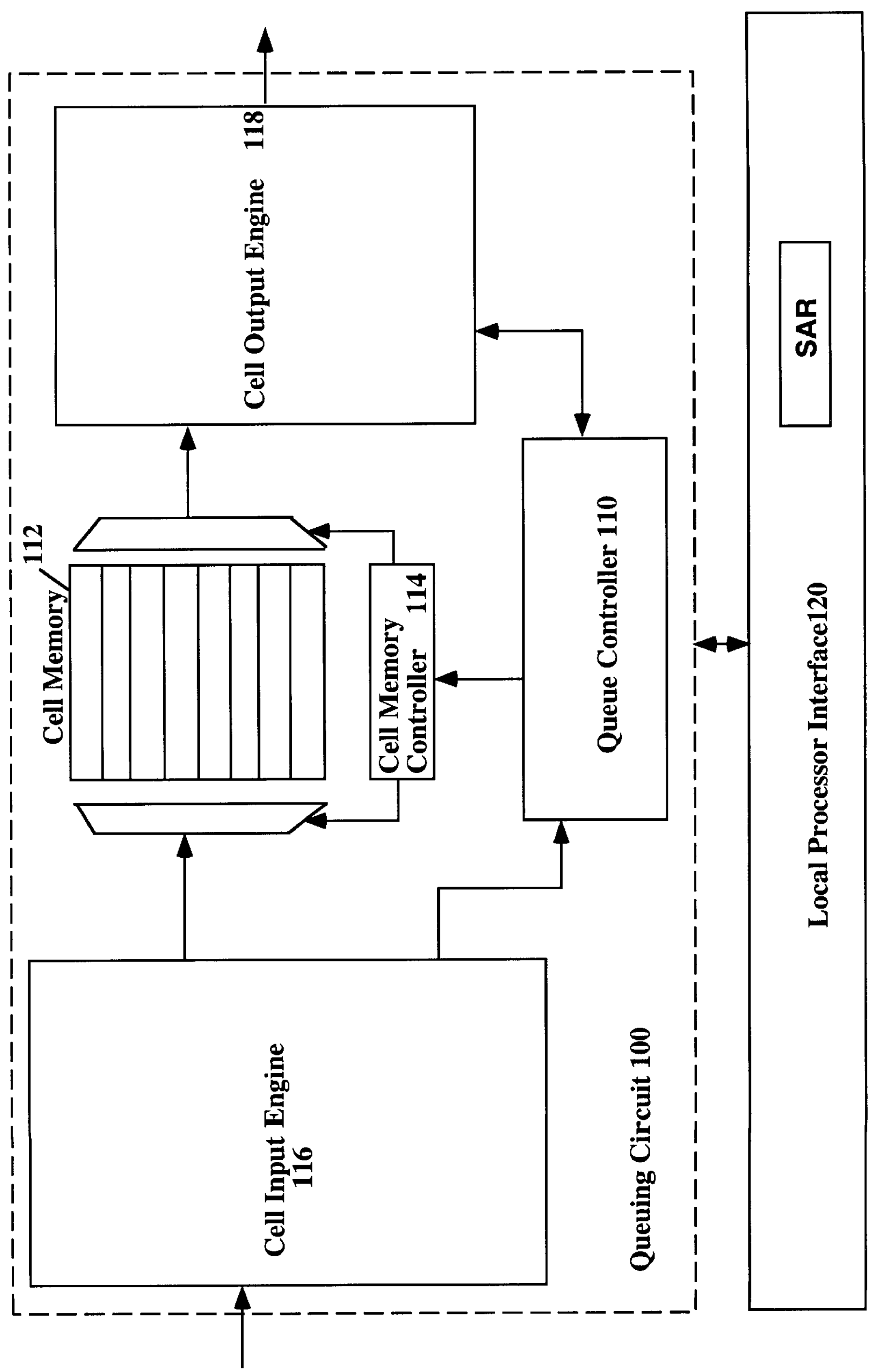
FIG. 3 illustrates a block diagram of the structure of the queuing circuit illustrated in FIG. 2 according to one embodiment of the present invention.

FIG. 3 illustrates a block diagram of the structure of queuing circuit 100 according to one embodiment of the present invention. Queuing circuit 100 is described in detail in related application Ser. No. 08/885,400, filed Jun. 30, 1997, entitled "Multi-Stage Queuing Discipline". In summary, a queue controller 110 controls the storage of cells in cell memory 112 through cell memory controller 114 and keeps track of the location and sequence of the cells so stored through the use of linked lists. Cell input engine (CIE) 116 receives incoming cells and stores the received cells in a receive queue. After CIE 116 receives a cell, it extracts the cell's connection, source and other information, and presents the information to queue controller 110 for processing.

Upon receipt of the cell information provided by CIE 116, queue controller 110 checks relevant cell count thresholds (see related application Ser. No. 08/885,400, filed Jun. 30, 1997, entitled "Multi-Stage Queuing Discipline") to determine whether the newly arriving cell can be accommodated in the cell memory 112. Assuming that the cell is accepted, queue controller 110 increments the appropriate statistics and cell counts for the arriving cell and determines where to store the cell in cell memory 112. This storage location is linked to the tail of the appropriate queue (VC queue or QBin queue) and the cell is stored to cell memory 112 from CIE 116 under the control of cell memory controller 114.

The cell departure process involves the use of cell output engine (COE) 118. Cells depart from QBins and queue controller 110 is responsible for selecting a QBin for service. Once a QBin has been selected for service, queue controller 110 finds the cell memory 112 location of the cell at the head of the selected QBin and provides this information to cell memory controller 114. The cell at the designated storage location is then read out of cell memory 112 to COE 118 which loads the cell into an output queue. Connection information from the departing cell is extracted and provided to queue controller 110 which uses this information to retrieve and update the relevant queue statistics and cell counts and provides COE 118 with VCI, VPI, and EFCI update information for the departing cell. The cell is then transmitted by COE 118.

Figure 4:
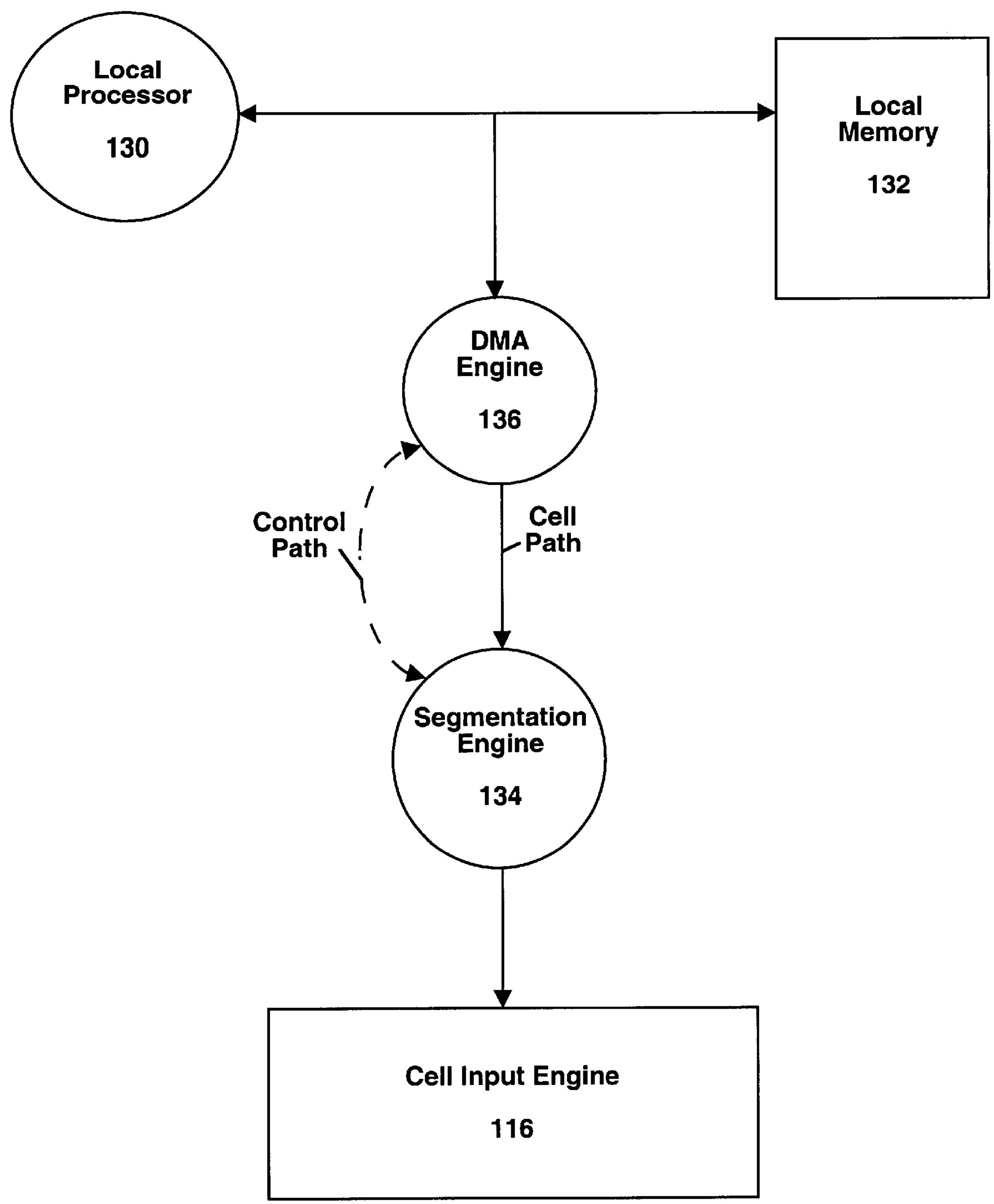
FIG. 4 illustrates a cell segmentation engine according to one embodiment of the present invention.

As indicated above, this same queuing circuit 100 may be used by a local processor to accomplish frame injection and extraction. During frame injection, a data frame is segmented into ATM cells for handling by queuing circuit 100. This may be accomplished using a segmentation engine which may be part of local processor interface 120 and may further be performed under DMA control as shown in FIG. 4.

In this embodiment, a local processor 130 stores data in a local memory (e.g., a RAM) 132. Such data may be stored as frames for an application running on local processor 130. When the data is to be transmitted, local processor 130 configures cell header information for the data and also determines the frame length in terms of the number of cells (48-byte payloads). The data frame may then be provided to a segmentation engine 134 which will segment the frame into ATM cells for queuing circuit 100. This may be accomplished using a DMA channel under the control of DMA engine 136. For one embodiment, the varying length frame is padded out to an n×48-byte size.

Segmentation engine 134 segments the frame of data into ATM cells according to the AAL-5 protocol and adds the header information provided by local processor 130. The completed cells are then injected into CIE 116 through a dedicated cell input queue (not shown). Thus, the injected cells appear as regular ATM traffic to queuing circuit 100, allowing the use of the queuing structure described above to manage the buffer resources of the cell memory 112. Note that as segmentation engine 134 is building the ATM cells, dedicated hardware may be used to accumulate the CRC-32 value for the frame's worth of data. This information will be provided with the final cell of the frame.

Figure 5:
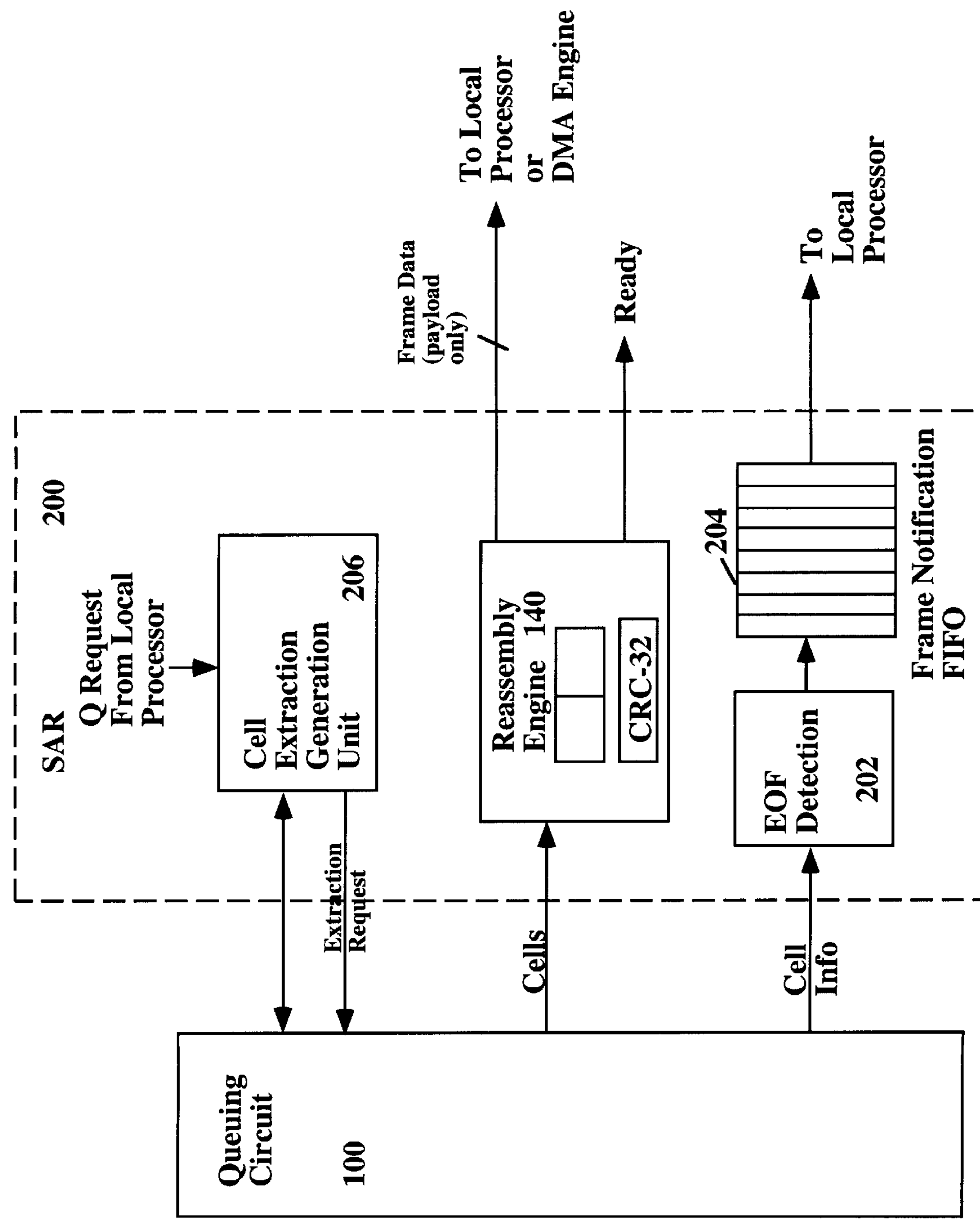
FIG. 5 illustrates a segmentation and reassembly unit for use with the queuing circuit shown in FIG. 3 according to one embodiment of the present invention.

Referring now to FIG. 5, frame extraction makes use of a reassembly engine 140 and a segmentation and reassembly (SAR) unit 200, both of which may be part of local processor interface 120. The extracted frame of data is built of cells received on a VC which is terminated at queuing circuit 100. This terminated VC is configured to queue to a VC queue as regular ATM traffic in the manner described above. SAR unit 200 is then responsible for detecting end-of-frame (EOF) indications for arriving cells, capturing the logical connection and frame length values for VCs with EOF detection enabled, notifying the local processor about frame arrival status and generating extraction requests. For this embodiment, incoming frames for the local processor are assumed to correspond to the AAL-5 format specified by ITU-T Recommendation I.363 and its various revisions, however, other AAL formats may be used for other embodiments.

SAR unit 200 includes EOF detection unit 202, frame notification FIFO 204 and cell extraction generation unit 206. SAR unit 200 detects EOF cells for all arrivals using EOF detection unit 202. If reassembly is enabled for the VC (as indicated by queue controller 110), then the logical connection information and the frame length (from the frame length field of the AAL-5 frame) is written into frame notification FIFO 204. The FIFO can hold, in one embodiment, up to 31 entries. SAR unit 200 also maintains a count of the current number of entries in frame notification FIFO 204. This counter is incremented when an EOF cell arrives to a VC with EOF detection enabled, and is decremented when the local processor reads FIFO 204. SAR unit 200 provides status bits to the local processor to allow the local processor to monitor the activity of the frame notification FIFO 204. In this way, the local processor knows when the FIFO 204 has entries and is getting full.

When the last cell in a frame has been detected, the information is written to the frame notification FIFO 204 and the local processor may extract the information to obtain the details of the frame, such as the corresponding VC queue number and the frame length. With this information, the local processor may allocate memory (preferably, contiguous memory locations within the local memory are reserved) to receive the frame and may also configure a DMA channel for the extraction process.

When these resources are available, the local processor submits a frame extraction request (Q request) by specifying the extraction queue number and cell extraction generation unit 206 begins extracting the cells of the frame from the queuing circuit 100. A buffer in the reassembly engine 140 temporarily holds the cell data while it is being passed between the queuing circuit 100 and the local processor. The cell extraction generation unit 206 extracts cells by asserting cell extraction requests to the queuing circuit 100. These requests are asserted when buffer space in reassembly engine 140 is available and the EOF cell has not yet been extracted. Queuing circuit 100 uses available bandwidth to cell memory 112 to extract cells and copies the cells to the buffer of the reassembly engine 140. Cell extraction generation unit 206 tests each departing cell for an EOF indication as queuing circuit 100 copies the cell to the reassembly engine buffer. If the cell is not the EOF cell, another request to queuing circuit 100 is generated. Once the EOF cell is detected, no more extraction requests are made until the local processor submits a new frame extraction request.

Reassembly engine 140 receives the cells from queuing circuit 100 and strips off the cell header information. The cell payload information for each cell of the received frame is read out by the local processor or a DMA controller for storage in the local memory at the reserved memory locations. A data ready signal is generated by reassembly engine 140 to indicate when its local buffer has data available for extractions by the DMA channel. This signal may be used in a conventional fashion as part of a DMA handshake protocol.

Reassembly engine 140 also maintains a CRC-32 check (e.g., using dedicated hardware) on the received data and, upon receipt of the last cell of the frame, compares this computed CRC-32 with the CRC-32 value from the last cell.

The CRC-32 location of the last cell may then be overwritten with a "good/no-good" (i.e., pass/fail) indicator depending on whether the computed CRC-32 matched the received CRC-32. This will allow the local processor to determine whether the frame data is correct.

Thus a method and apparatus for using ATM queues for segmentation and reassembly have been described. Although the foregoing description and accompanying figures discuss and illustrate specific exemplary embodiments, it should be appreciated that the present invention is to be measured only in terms of the claims which follow.

What is claimed is:

1. A method comprising:

generating a data frame having data information at a processor;

storing the data frame in a memory;

providing the data frame to a processor interface having a segmentation engine and a direct memory access (DMA) engine;

segmenting the data frame into a plurality of cells at the processor interface using the segmentation engine and the DMA engine; and injecting each of said cells into a cell input engine by transferring each of said cells to a number of memory locations by DMA transfer within a cell memory; and establishing a series of linked list pointers associated with said memory locations, wherein said series of linked list pointers includes a logical queue;

wherein the number of memory locations is based on a length of the data frame.

2. A method as in claim 1 further comprising the step of transmitting said cells into a digital network in an order specified by said linked list pointers.

3. A digital switch comprising:

a queuing circuit having a number of connection queues and class of service queues and configured to store a plurality of ATM cells, said cells including payload information and header information within said connection queues and said class of service queues based upon said header information; and a segmentation and reassembly (SAR) engine coupled to said queuing circuit and configured to extract cells from said queuing circuit that are bound for a local processor of said switch so as to preserve said payload information and to create and inject cells formed from data frames originated by said local processor into said queuing circuit;

wherein said segmentation and reassembly engine includes a direct memory access (DMA) engine having a DMA channel, and a segmentation engine to segment a frame into a plurality of cells by using the DMA channel of the DMA engine, wherein the SAR engine is configured to input cells into the queuing circuit by transferring each of said cells to a number of memory locations by DMA transfer within a cell memory; and establishing a series of linked list pointers associated with said memory locations, wherein said series of linked list pointers includes a logical queue.

4. A digital switch as in claim 3 wherein said segmentation and reassembly engine is further configured to strip off said header information from said cells after extracting said cells.

5. A digital switch as in claim 4 wherein said segmentation and reassembly engine is further configured to perform error detection operations for frames of data reconstructed from extracted cells using payload information therefrom.

6. A digital switch as in claim 5 wherein said segmentation and reassembly engine is further configured to compute a CRC-32 value for use in said error detection operations.

7. A digital switch as in claim 6 wherein said segmentation and reassembly engine is further configured to overwrite the CRC-32 value for said reconstructed frames of data with a pass/fail flag according to said error detection operations.

* * * * *